(12) United States Patent
Hart et al.

(10) Patent No.: US 7,651,872 B2
(45) Date of Patent: *Jan. 26, 2010

(54) DISCRETE NANO-TEXTURED STRUCTURES IN BIOMOLECULAR ARRAYS, AND METHOD OF USE

(75) Inventors: Mark Whitney Hart, San Jose, CA (US); Ho-Cheol Kim, San Jose, CA (US); Robert Dennis Miller, San Jose, CA (US); Gregory Michael Wallraff, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/028,767

(22) Filed: Feb. 8, 2008

(65) Prior Publication Data

US 2008/0132426 A1  Jun. 5, 2008

Related U.S. Application Data

(60) Continuation of application No. 11/184,702, filed on Jul. 19, 2005, now Pat. No. 7,354,777, which is a division of application No. 10/214,951, filed on Aug. 7, 2002, now Pat. No. 6,962,822.

(51) Int. Cl.
*H01L 21/00* (2006.01)

(52) U.S. Cl. .......................... 438/1; 257/E51.02; 435/6
(58) Field of Classification Search .................... 438/1; 435/4, 6, 7.1
See application file for complete search history.

(56) References Cited

U.S. PATENT DOCUMENTS

| | | | |
|---|---|---|---|
| 5,895,263 A * | 4/1999 | Carter et al. ................ 438/624 |
| 6,610,499 B1 * | 8/2003 | Fulwyler et al. ............. 435/7.1 |
| 7,056,840 B2 | 6/2006 | Miller et al. |
| 7,112,617 B2 | 9/2006 | Kim et al. |
| 7,282,241 B2 | 10/2007 | Kim et al. |
| 2007/0231559 A1 | 10/2007 | Kim et al. |

* cited by examiner

*Primary Examiner*—Alexander G Ghyka
(74) *Attorney, Agent, or Firm*—Daniel E. Johnson

(57) ABSTRACT

A biomolecular array includes a substrate across which is distributed an array of discrete regions of a porous substance formed from a porogen-containing organosilicate material. The porous substance is designed to bind chemical targets useful in biotechnology applications, such as gene expression, protein, antibody, and antigen experiments. The regions are preferably optically isolated from each other and may be shaped to enhance detection of optical radiation emanating from the porous substance, e.g., as a result of irradiation of the regions with ultraviolet light. The discrete regions may be configured as microscopic wells within the substrate, or they may reside on top of the substrate in the form of microscopic mesas.

21 Claims, 5 Drawing Sheets

DISCRETE NANO-TEXTURED STRUCTURES IN BIOMOLECULAR ARRAYS, AND METHOD OF USE

This application is a continuation of Applicants' application Ser. No. 11/184,702 filed Jul. 19, 2005 and titled "Discrete nano-textured structures in biomolecular arrays, and method of use", which is a divisional of Applicants' application Ser. No. 10/214,951 filed Aug. 7, 2002 and also titled "Discrete nano-textured structures in biomolecular arrays, and method of use" (now U.S. Pat. No. 6,962,822), both of which are hereby incorporated by reference.

TECHNICAL FIELD

The invention is in the field of biomolecular arrays, and more particularly, the invention relates to biomolecular arrays having high areal density.

BACKGROUND

Biomolecular arrays have quickly developed into an important tool in life science research. Microarrays, or densely-packed, ordered arrangements of miniature reaction sites on a suitable substrate, enable the rapid evaluation of complex biomolecular interactions. Because of their high-throughput characteristics and low-volume reagent and sample requirements, microarrays are now commonly used in gene expression studies, and they are finding their way into significant emerging areas such as proteomics and diagnostics.

The reaction sites of the array can be produced by transferring, to the substrate, droplets containing biological or biochemical material. A variety of techniques can be used, including contact spotting, non-contact spotting, and dispensing. With contact spotting, a fluid bearing pin leaves a drop on the surface when the pin is forced to contact the substrate. With non-contact spotting, a drop is pulled from its source when the drop touches the substrate. With dispensing, a drop is delivered to the substrate from a distance. Reaction sites on the array can also be produced by photolithographic techniques (such as those employed by Affymetrix or NimbleGen, for example).

The quality of the reaction sites directly affects the reliability of the resultant data. Ideally, each site would have a consistent and uniform morphology and would be non-interacting with adjacent sites, so that when a reaction occurred at a given site, a clear and detectable response would emanate from only that one site, and not from neighboring sites or from the substrate. To reduce the overall size of an array while maximizing the number of reaction sites and minimizing the required reagent and sample volumes, the sites on the array should have the highest possible areal density.

With the present microarray technology, which is dominated by the use of flat substrates (often glass microscope slides), areal density is limited. To increase the signal from a given reaction site, the interaction area between the fluid and the substrate should be maximized. One way to do this is by using a surface that promotes wetting. A flat surface that promotes wetting, however, can lead to spots (and thus sites) having irregular shapes and compositions. A flat wetting surface can also lead to the spreading of fluid from its intended site into neighboring sites. Thus, flat surfaces are intrinsically limited by fluid-surface interactions that force a tradeoff between the desired properties of the reaction sites.

To make the sites more uniform, the surface can be made non-wetting. Unfortunately, this reduces the interaction area between the fluid and the surface and therefore reduces the signal that would otherwise be obtainable. In addition, since droplets do not adhere well to a flat non-wetting surface, deposition volumes can vary from site to site, and droplets can slide away from their intended place.

There is still a need for an improved biomolecular microarray apparatus that has a high areal density of sites and that permits the collection of data with good signal/noise ratio. Such an apparatus would ideally have sites of consistent and uniform spot morphology.

SUMMARY OF THE INVENTION

Preferred embodiments of the invention are directed to chemical and/or biochemical applications, and include a substrate having an array of discrete regions of a porous substance designed to bind chemical targets. These regions are preferably optically isolated from each other and may be shaped to enhance detection of optical radiation emanating from the porous substance, e.g., fluorescence as a result of irradiation of the regions with ultraviolet, visible, or infrared light. For example, these regions may have a parabolic or hemispherical contour. The discrete regions themselves may be microscopic wells formed in the substrate, or they may reside on top of the substrate as microscopic mesas.

One preferred embodiment is a device that includes a substrate across which is distributed an array of discrete regions of porous material to which are bound respective chemical targets, in which the porous material is formed from a porogen-containing organosilicate material. These regions may be advantageously optically isolated from each other and may have respective boundaries contoured to enhance detection of optical radiation emanating from the discrete regions. They may have, for example, a characteristic transverse dimension that is between 1 and 200 microns, between 1 and 100 microns, or between 1 and 50 microns. Furthermore, these regions may be adjoined by an optical coating designed to enhance optical emission from them, in which case the optical coating and the porous material may be located on opposite sides of boundaries of the regions. The regions may further include a hydrophobic coating.

The array may comprise discrete wells formed in a surface of the substrate. The wells may have respective volumes that are at least 25% filled by the porous material, at least 50% filled, or at least 75% filled. The wells may further include non-porous vertically oriented members that are in contact with the substrate and pass through the wells. Alternatively, the array may include discrete mesas over a surface of the substrate. The mesas may include non-porous vertically oriented members that are in contact with the substrate and pass through the mesas.

Another embodiment of the invention is a device that includes a substrate across which is distributed a two-dimensional array of discrete regions of porous material to which chemical targets can be attached, in which the porous material is formed from a porogen-containing organosilicate material. These regions may have a characteristic transverse dimension that is between, for example, 1 and 200 microns, 1 and 100 microns, or 1 and 50 microns. The regions may be wells formed in a surface of the substrate, and these wells may advantageously have respective volumes that are at least 25% filled by the porous material, and in addition, they may be optically isolated from each other. Also, the array may include discrete mesas over a surface of the substrate.

DETAILED DESCRIPTION OF THE INVENTION

Figure 1:
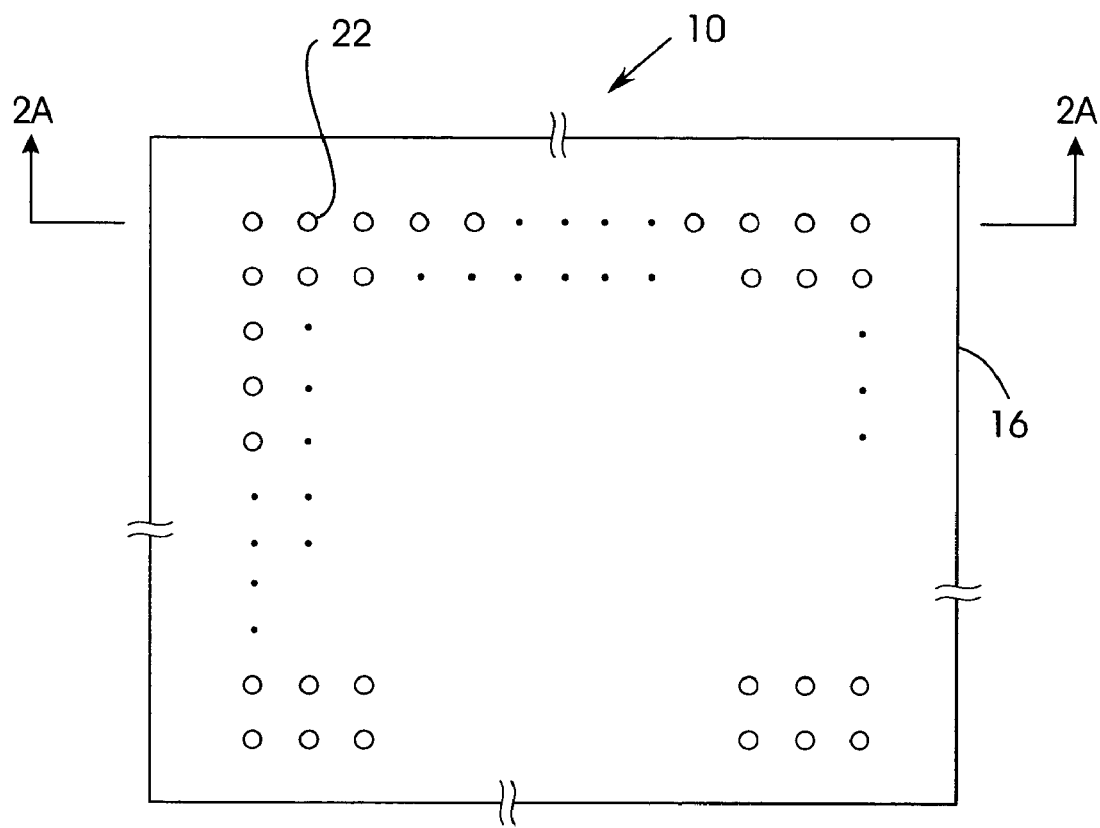
FIG. 1 is a plan view of a biochip having an array of microscopic wells ("microwells") that contain porous material, in accordance with a preferred implementation of the invention.

Preferred embodiments of the invention are now described with reference to the accompanying figures, in which like numerals refer to like parts. FIG. 1 shows a plan view of a biochip 10 that includes a substrate 16 into which a number of small wells 22 or microwells have been formed. As discussed below, the microwells 22 have porous material therein (see FIG. 5, for example), resulting in a significant increase in effective surface area, and thereby permitting more sensitive detection measurements to be made. The microwells 22 (and the micromesas discussed below) may have a characteristic transverse (lateral) dimension of about 1-500 microns, preferably 1-200 microns, more preferably 1-100 microns, still more preferably 1-50 microns, or most preferably 1-10 microns (e.g., if the microwells have a circular cross section, their diameters may be about 1 micron; for a square cross section, the corresponding square may be about 1 micron×1 micron). The depth of each microwell 22 (or height of the micromesas discussed below) may be about 1-50 microns or more preferably 0.5-50 microns. The width of the substrate 16 that separates adjacent microwells 22 (or the distance separating the micromesas discussed below) is preferably sufficient to optically isolate one microwell 22 from adjacent microwells, e.g., 0.1-10 microns. The material separating adjacent microwells 22 is preferably optically opaque; if this material is not intrinsically optically opaque, the microwells may have roughened surfaces so that light is scattered, or these surfaces may be coated (as discussed below).

Figure 2A:
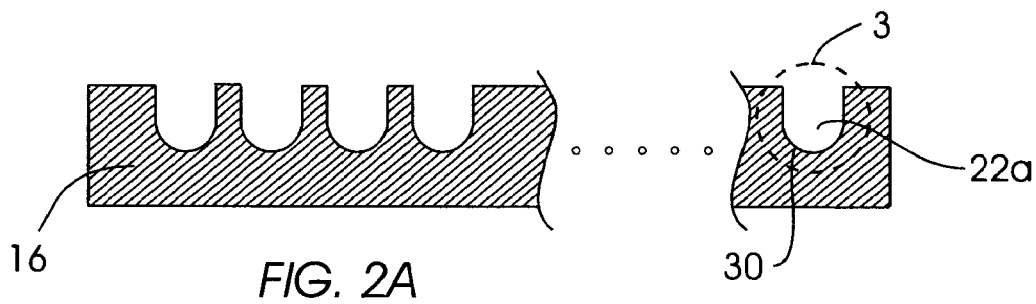
FIGS. 2A and 2B are cross sectional side views of biochips that have microwells of different shapes.

The substrate 16 may be either an organic or an inorganic material. For example, the substrate may be silicon or glass which has undergone a (dry or wet) mask/etch process (e.g., those used in the field of semiconductor processing) to form the microwells 22. An isotropic process can be used to form wells 22a having a contoured shape, e.g., a parabolic shape, such as that depicted in FIG. 2A. (Other preferred shapes include prismatic, cylindrical, and hemispherical.) An anisotropic process (such as is attainable in some dry etch processes) is more appropriate for the formation of microwells 22b that are cylindrically shaped, like those shown in FIG. 2B.

Alternatively, the substrate 16 may be plastic. In this case, an embossing technique known to those skilled in the art may be used, in which protrusions in the embossing master penetrate the plastic to form the microwells 22a or 22b. Likewise, an injection molding process may used to form the substrate 16/microwells 22 assembly. In general, whether the substrate 16 is plastic, glass, silicon, or another material, wells 22 having a contoured shape (like the wells 22a of FIG. 2A) are preferred, as they permit more sensitive optical detection, as discussed below. As used herein, the term optical includes ultraviolet, visible, and infrared electromagnetic radiation.

Figure 3:
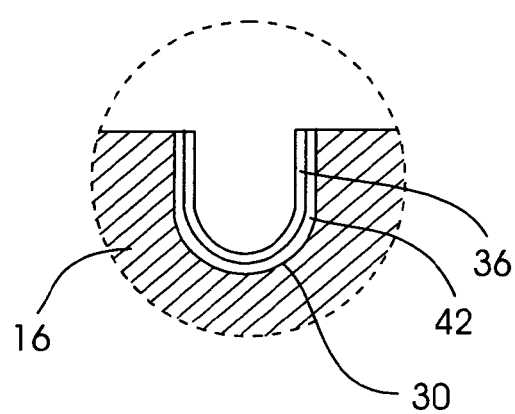
FIG. 3 is an enlarged view of a microwell that includes optical and hydrophobic coatings.
Figure 4:
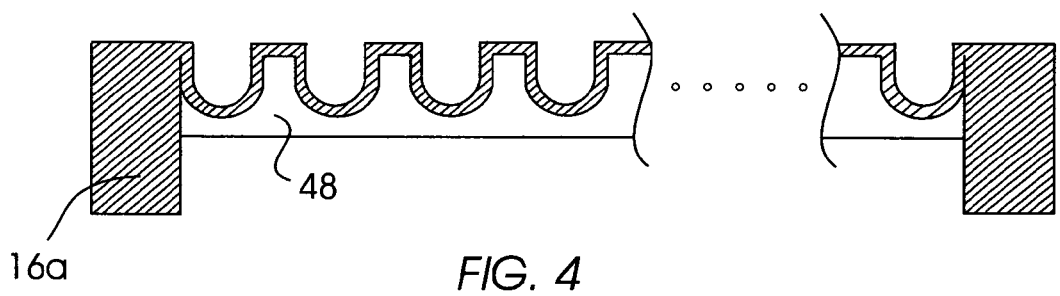
FIG. 4 is a cross sectional side view of a biochip in which an optical coating has been applied to the underside of the substrate.
Figure 5:
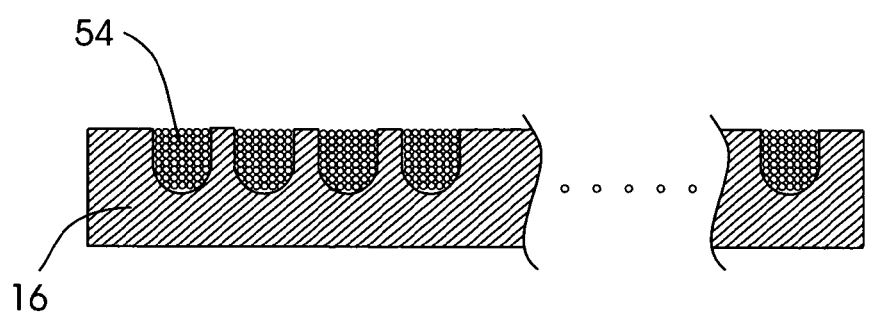
FIG. 5 shows porous material within the microwells of the biochip.

The microwells 22 preferably have walls 30 that are hydrophobic to reduce unwanted spreading of aqueous reagents added to the porous material 54. If plastic is used as the substrate 16, this property may be intrinsic to the plastic, as is the case with such thermally stable materials like polycarbonates, polyesters, polyimides, polyazoles, and polyolefins. Alternatively, one may coat or otherwise treat the walls 30 of the wells 22a or 22b so that they are hydrophobic, e.g., a hydrophobic coating 36 such as an organic wax or surface active reagent (such as hexamethyldisilazane) may be applied to the walls 30. In the event that an optical detection arrangement is used (in which optical radiation at an input wavelength is directed towards chemical or biochemical material bound to porous material in the wells 22, and optical radiation at an output wavelength emanates away from the wells, as discussed in greater detail below), an optical coating 42 may be first applied to the walls 30, followed by the application of the hydrophobic coating 36 (see FIG. 3). The hydrophobic coating 36 is preferably not absorbing at either the input or the output wavelength, whereas the optical coating 42 is preferably both non-absorbing and reflective at both of these wavelengths. If a thin-walled embossed plastic is used as a substrate 16a, then a reflective optical coating 48 such as silver or aluminum may be applied to the underside of the substrate, as shown in FIG. 4. The microwells 22 are preferably at least 25% filled (in the volumetric sense) with a porous material 54, still more preferably at least 50% filled with porous material, and most preferably substantially filled with porous material (e.g., 75-90% or more, as illustrated in FIG. 5). One preferred nanoporous material is formed using an organosilicate material (such as methylsilsesquioxane, or MSSQ) that has been mixed with a sacrificial porogen in a solvent. (See, for example, U.S. Pat. No. 5,895,263 to Carter et al. issued Apr. 20, 1999 and titled "Process for manufacture of integrated circuit device", which is hereby incorporated by reference.) The solvent containing the porogen and MSSQ is applied over the substrate 16 by spraying, spin coating, or doctor blading (or another technique known to those skilled in the art), so that the wells 22 are filled with the solvent/MSSQ/porogen mixture. Excess solvent on the substrate 16 may be wiped away, and the solvent is allowed to evaporate. As the remaining MSSQ/porogen mixture is then heated (or exposed to an oxygen plasma), the porogen decomposes within the MSSQ host material, leaving tiny voids therein. In this manner, porous material 54 is formed in the microwells 22. (Note that the particular method used for producing the porous material 54 may impact the hydrophilicity of the porous material.) This process may be repeated as desired, until, for example, the microwells are substantially filled with porous material 54. If multiple coatings are applied, each coating may be cured to 250° C. in an inert atmosphere to produce a layered nanohybrid which is subsequently cured to >400° C. to produce porosity. The substrate 16 may be polished or etched as needed to remove any excess material that remains on the top of the substrate between the microwells 22. Organosilicate materials that may be used in combination with porogens include inorganic materials such as sol-gel silica, silica, and spin-on glasses, and inorganic-like materials such as substituted silsesquioxanes (SSQs) (such as methyl SSQ, hydrido SSQ, alkyl SSQ, aryl SSQ), as well as copolymers of the foregoing.

Alternatively, controlled pore glass may be used. Controlled pore glass is made starting with a borosilicate material that is heated, resulting in separation of the borates and the silicates within the borosilicate material. After then leaching out the borates, one is left with a glass having pores of substantially uniform size. One commercially available source of controlled pore glass is Controlled Pore Glass, Inc., Lincoln Park, N.J. A slurry made from solvent and microscopic particles of controlled pore glass may be made (or silica aerogel particles can also be used, either alone or in a matrix of sol-gel silica, silica, spin-on glasses, substituted silsesquioxanes (SSQs) (such as MSSQ, hydrido SSQ, alkyl SSQ, aryl SSQ), and copolymers thereof) and passed over the substrate 16. After the solvent has evaporated, any excess pore glass on the substrate 16 may be polished or scraped off, and the remaining pore glass may be sintered in situ so that the pore glass is bound within the microwells 22, i.e., to the walls 30 of the microwells. If necessary, the substrate 16 may then be polished back to ensure that the pore glass resides only within the microwells 22, and not on top of the substrate 16. (Alternatively, one can vapor deposit borosilicate glass into the microwells, polish, leach out the borates, and anneal.) A more elaborate method for adding pore glass particles to the microwells involves the use of patterned electric and/or magnetic fields. The particles can be drawn into the wells 22 electrokinetically, or if controlled pore glass particles having magnetic impurities therein are used, by a magnetic field. The pore glass particles can then be manipulated by introducing, underneath the substrate 16, a patterned electric and/or magnetic field having high field gradients and/or strengths, so that the pore glass particles are drawn into the microwells 22. To this end, one can position a plate having a patterned array of metal protrusions underneath the substrate 16, with the protrusions being aligned with respective microwells.

The apparatuses disclosed herein can be used with a variety of tagged detection methods, and are well suited for use with detection methods that employ optical detection techniques. The porous material 54 in each of the microwells 22 within the biochip 10 (or the porous material in the "micromesas", see below) is individually prepared with a chemical or biochemical target or material. For example, in a common gene expression experiment, each microwell 22 may contain a different oligonucleotide or DNA fragment attached to the porous material 54 using the same chemical derivatization procedure known to those in the art for planar substrates. (See, for example M. C. Pirrung, *Angew. Chem. Int. Ed.*, vol. 41, 2002, pp. 1276-1289.) RNA may be extracted from cells treated with a drug of interest, and DNA copies from this RNA may then be constructed which are then "tagged" with dyes that fluoresce (e.g., in the visible region of the spectrum) when exposed to input radiation (e.g., ultraviolet, or even visible or infrared). A solution containing this "tagged" DNA may then be washed over the biochip 10, so that the tagged DNA binds itself to any complementary DNA that has been previously attached to the porous material 54 in the microwells 22. Emission from an input electromagnetic radiation source (e.g., ultraviolet, visible or infrared) may then be directed onto the biochip 10, and emission from the fluorescent dyes identifies those particular microwells 22 (and thus those DNA strands) that complement the RNA extracted from the cells. More sensitive detection is possible if the microwells have boundaries that are appropriately contoured, e.g., if they have a parabolic shape, since a greater fraction of the light from the fluorescent dyes can then be collected. Even greater detection sensitivity is possible if reflecting layers are incorporated. A sensor or array of sensors can be used to detect the fluorescent emission, and the data can be processed by a computer. (For additional details regarding biochip technology, see, for example, "Making chips to probe genes", Samuel K. Moore, *IEEE Spectrum*, vol. 38, March 2001, pp. 54-60.) Analogous detection methods may be used in connection with complementary RNA and DNA strands, antibody-antigen, ligand-receptor, agonist-receptor, antagonist-receptor, enzyme-substrate, and enzyme-inhibitor combinations.

As discussed above, each of the microwells 22 in the biochip 10 may be individually prepared with chemical or biochemical material, i.e., biochemical material may be bioconjugated or "bioattached" to the porous material 54 in each microwell 22. This bioattachment is generally intrinsic to the porous material, i.e., independent of its size and/or shape. Linkers (i.e., primers) may be utilized for attaching the biochemical material to the porous material. Such a linker may advantageously include a substrate binder (e.g., $(EtO)_3Si$), a spacer (such as linear alkyl, aryl alkyl, alkylene ether), and a group having reactive functionality (e.g., $NH_2$, OH, COOH). Further details regarding the chemistry of linkers can be found in the article by M. C. Pirrung, supra.

Figure 2B:
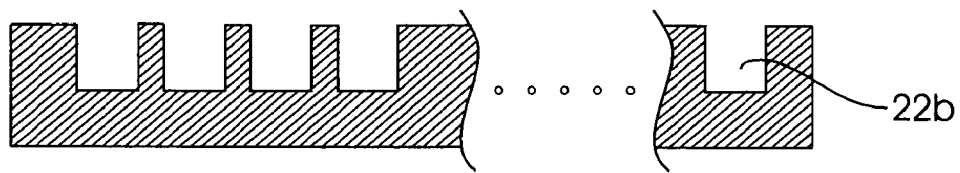
Figure 6A:
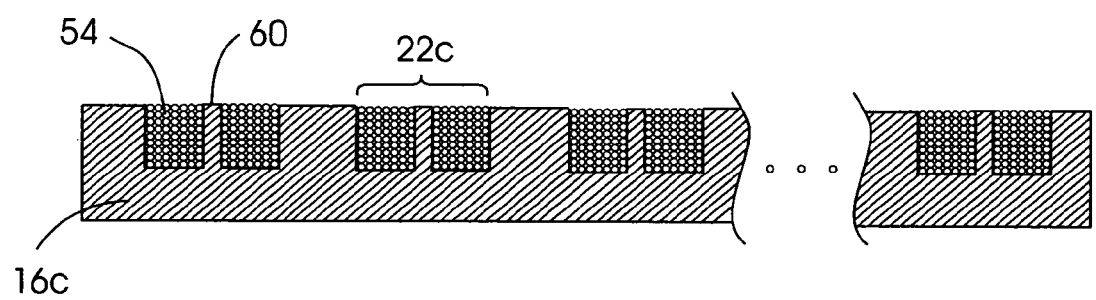
FIGS. 6A and 6B show cross sectional and plan views, respectively, of a biochip in which the microwells include vertical members that facilitate introduction of biochemical material into the microwells.
Figure 6B:
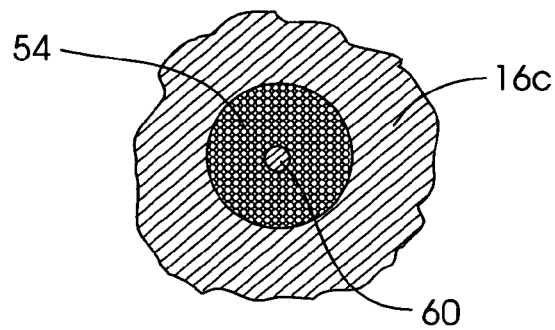

Biochemical material may be attached to the porous material 54 through a primer or directly via one of a variety of techniques, such as contact spotting, non-contact spotting, or dispensing. If one of these techniques is used with the embodiment shown in FIG. 5, for example, a fluid bearing pin or drop of fluid is brought into direct contact with the porous material 54 in the microwells 22. To reduce the possibility that the porous material 54 might be damaged as a result of this fluid transfer process, one can use the alternative microwell construction illustrated in FIGS. 6A (a cross sectional, side view of a substrate 16c) and 6B (a partial plan view). The substrate 16c has a number of microwells 22c therein, each of which includes a mechanically robust vertical member 60 that passes through the porous material 54 and is preferably located at or near the center of the microwell 22c. The vertical member 60 is shown as being an integrated part of the non-porous substrate 16c, and may be formed along with the microwells 22c as a result of an etch/mask process like one of those described herein. With the embodiment of FIGS. 6A and 6B, the fluid bearing pin or drop of fluid that contains the biochemical material may be brought into contact with the vertical member 60, thereby allowing the fluid to dissipate away from the vertical member into the porous material 54. In this way, the structural integrity of the porous material 54 is protected. The boundaries of the wells 22c may have one of a number of shapes, e.g., they may be contoured as in FIG. 2A or cylindrically-shaped as shown in FIG. 2B.

Figure 7A:
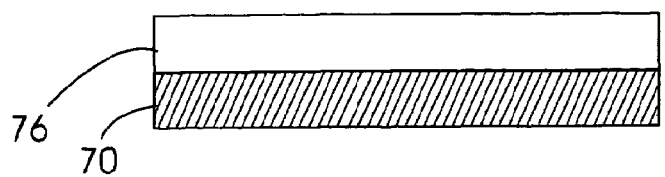
FIGS. 7A-7G illustrate a series of steps used to form a biochip having porous material arranged in the form of microscopic mesas ("micromesas")
Figure 7B:
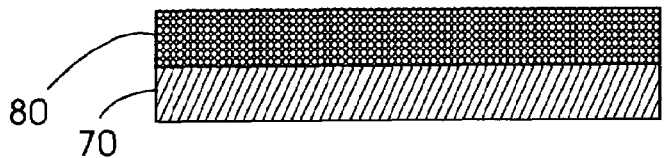
Figure 7C:
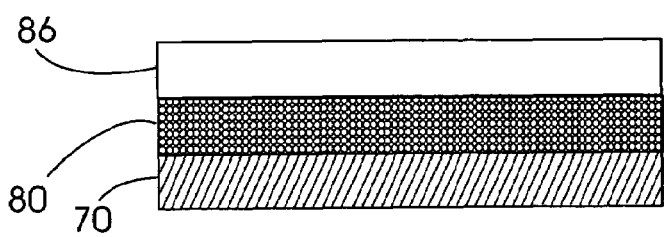
Figure 7D:
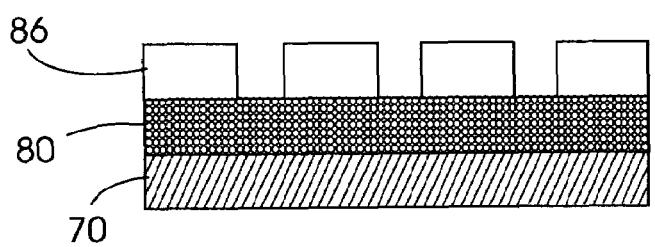
Figure 7E:
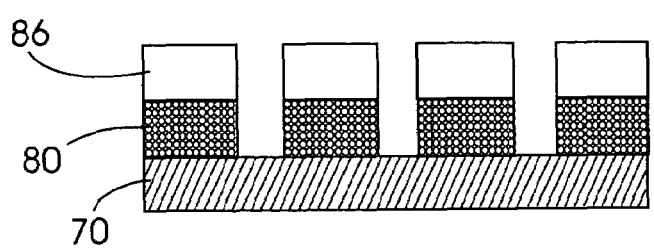
Figure 7F:
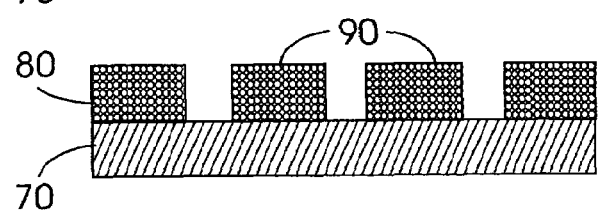
Figure 7G:
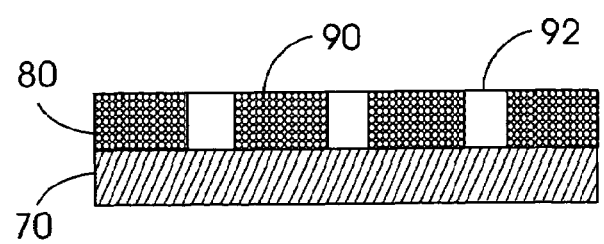

FIGS. 7A-7E correspond to steps in a lithographic process leading to the "micromesa" structure shown in FIGS. 7F and 7G, which is an alternative to the microwell apparatuses discussed above. FIG. 7A shows a substrate 70 onto which a porogen-containing organosilicate 76 (dissolved in solvent) such as MSSQ has been deposited. As shown in FIG. 7B, the organosilicate 76 is converted to porous material 80 upon exposure to heat or an oxygen plasma. FIG. 7C illustrates how a photoresist 86 is then laid over the porous material 80. The photoresist is exposed to UV light and developed, leading to the structure shown in FIG. 7D. Etching of the porous material 80 results in the structure illustrated in FIG. 7E. As shown in FIG. 7F, the remaining photoresist is then removed, leaving the porous material 80 in the form of micromesas 90 that reside on the substrate 70. The micromesas 90 may advantageously be in the form of cylinders or rectangular parallelepipeds. FIG. 7G shows how an absorptive coating 92 may be introduced between the micromesas 90, in order to provide better optical isolation between them. The coating 92 used between the micromesas 90 may be advantageously hydrophobic. As an alternative to the fabrication process outlined above, the organosilicate 76 may be converted to porous material 80 at a later stage in the process, e.g., after the remaining photoresist shown in FIG. 7E has been removed.

Alternatively, the micromesas 90 can be made in a non-lithographic process by contact molding a film (of MSSQ and porogen) from an embossing master. The film can be heated to 250° C. in an inert atmosphere to generate the nanohybrid. The embossing master can be removed, and porosity may be generated by heat or chemical treatment. Thereafter, a plasma descum process can be used to remove any thin film left in the patterned depressions of the film on the substrate.

Figure 8:
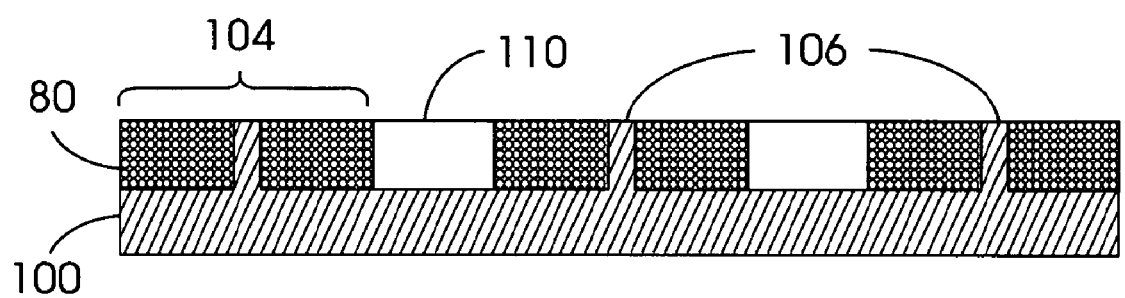
FIG. 8 shows a biochip that includes an array of micromesas having respective vertical members therein.

These micromesa fabrication processes may be modified so that the micromesas include a vertical member that passes through the porous material. FIG. 8 shows a substrate 100 that includes vertical members 106 surrounded by porous material 80, with each micromesa/vertical member unit 104 optionally separated by a coating 110. In this case, extra processing steps are required to form the vertical members 106 out of the substrate 100. The vertical members 106 can then be used when biochemical material is brought into contact with the porous material 80 to guard against the possibility of damaging the porous material, as discussed previously in connection with the microwell embodiments. During lithography, the walls of the mesas and also the surfaces between the mesas may be coated with a material opaque to the emitted fluorescence to improve optical site isolation. In addition, a reflecting layer (not shown) can be included below the mesas to reflect fluorescence emission, thereby enhancing the system's sensitivity.

The system sensitivity for preferred embodiments disclosed herein is at least a factor of 100 greater than that which can be achieved on a dense planar surface, and at least a factor of 10 greater than that which can be achieved on a non-porous surface that has been roughened, e.g., via an etching process.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A device, comprising a substrate across which is distributed an array of discrete regions of porous material, each of said regions including respective pores surrounded by organosilicate material, the discrete regions being bound to respective chemical targets, said array comprising discrete wells formed in a surface of said substrate, wherein said wells have respective volumes that are at least partially filled by said porous material.

2. The device of claim 1, wherein said regions are optically isolated from each other and have respective boundaries contoured to enhance detection of optical radiation emanating from said discrete regions.

3. The device of claim 1, wherein said regions have a characteristic transverse dimension that is between 1 and 200 microns.

4. The device of claim 1, each of said wells having:
   i) a shape that is substantially symmetric about an axis perpendicular to said substrate, and
   ii) a cross-section perpendicular to the axis that is substantially square or circular.

5. The device of claim 1, wherein said regions are adjoined by an optical coating designed to enhance optical emission from said discrete regions.

6. The device of claim 5, wherein said optical coating and said porous material are located on opposite sides of boundaries of said regions.

7. The device of claim 1, wherein said regions further include a hydrophobic coating.

8. The device of claim 1, wherein said wells have respective volumes that are at least 25% filled by said porous material.

9. The device of claim 8, wherein said wells have respective volumes that are at least 50% filled by said porous material.

10. The device of claim 8, wherein said wells have a characteristic transverse dimension that is between 1 and 50 microns.

11. The device of claim 8, further including non-porous vertically oriented members that are in contact with said substrate and pass through said wells.

12. A device, comprising a substrate across which is distributed an array of discrete regions of porous material, each of said regions including respective pores surrounded by organosilicate material, the discrete regions being bound to respective chemical targets, said array comprising discrete porous mesas over a surface of said substrate.

13. The device of claim 12, further including non-porous vertically oriented members that are in contact with said substrate and pass through said mesas.

14. The device of claim 12, wherein said mesas have a characteristic transverse dimension that is between 1 and 50 microns.

15. A device, comprising a substrate across which is distributed a two-dimensional array of discrete regions of porous material to which chemical targets can be attached, each of said regions including respective pores surrounded by organosilicate material, said array comprising discrete wells formed in a surface of said substrate, wherein said wells have respective volumes that are at least partially filled by said porous material.

16. The device of claim 15, wherein said regions have a characteristic transverse dimension that is between 1 and 200 microns.

17. The device of claim 15, each of said wells having:
   i) a shape that is substantially symmetric about an axis perpendicular to said substrate, and
   ii) a cross-section perpendicular to the axis that is substantially square or circular.

18. The device of claim 15, wherein said wells have respective volumes that are at least 25% filled by said porous material.

19. The device of claim 18, wherein said wells are optically isolated from each other.

20. A device, comprising a substrate across which is distributed a two-dimensional array of discrete regions of porous material to which chemical targets can be attached, each of said regions including respective pores surrounded by organosilicate material, said array comprising discrete porous mesas over a surface of said substrate.

21. The device of claim 15, wherein said discrete regions of said two-dimensional array are arranged in rows and columns.

* * * * *